United States Patent
Miura et al.

(10) Patent No.: US 9,382,380 B2
(45) Date of Patent: Jul. 5, 2016

(54) CHEMICAL SEALING FILM

(71) Applicant: CANON KABUSHIKI KAISHA, Tokyo (JP)

(72) Inventors: Toshinari Miura, Kawasaki (JP); Katsuhiro Matsuda, Kawasaki (JP); Takeshi Komuro, Matsudo (JP); Kie Yutaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/373,303

(22) PCT Filed: Dec. 26, 2012

(86) PCT No.: PCT/JP2012/084277
§ 371 (c)(1),
(2) Date: Jul. 18, 2014

(87) PCT Pub. No.: WO2013/111517
PCT Pub. Date: Aug. 1, 2013

(65) Prior Publication Data
US 2014/0371413 A1    Dec. 18, 2014

(30) Foreign Application Priority Data

Jan. 23, 2012  (JP) ................... 2012-011299
Dec. 7, 2012   (JP) ................... 2012-268546

(51) Int. Cl.
*C08G 59/00*  (2006.01)
*C08G 69/26*  (2006.01)
(Continued)

(52) U.S. Cl.
CPC ............. *C08G 69/26* (2013.01); *B41J 2/17536* (2013.01); *B41J 2/17559* (2013.01); *C08G 69/40* (2013.01); *C08J 5/18* (2013.01); *C08L 77/06* (2013.01); *G03G 15/0881* (2013.01); *C08J 2377/06* (2013.01); *C09K 3/10* (2013.01); *C09K 2200/0667* (2013.01)

(58) Field of Classification Search
CPC .......................................... C08G 69/02–69/50
USPC ................................................. 528/335–349
See application file for complete search history.

(56) References Cited

U.S. PATENT DOCUMENTS 6,347,865 B1 *   2/2002  Matsumoto et al. ............ 347/86
2006/0166092 A1 * 7/2006  Takahashi ........... H01M 2/1673
                                                               429/209

FOREIGN PATENT DOCUMENTS

JP    H05-178971 A    7/1993
JP    2007-146153 A   6/2007
(Continued)

OTHER PUBLICATIONS

Grosshardt et al., Chemie Ingenieur Technik 2009, 81, No. 11.*
(Continued)

*Primary Examiner* — Shane Fang
(74) *Attorney, Agent, or Firm* — Canon U.S.A., Inc., IP Division

(57) ABSTRACT

The present invention provides a chemical sealing film which has high chemical resistance and high breaking strength and which does not contain chlorine. The present invention relates to a chemical sealing film containing an organic compound represented by general formula (1) shown in Claim 1. In general formula (1), R is a linear alkylene group having carbon atoms of 5 or more and 10 or less and n is an integer of 10 or more and 480 or less.

6 Claims, 5 Drawing Sheets

(51) Int. Cl.

| | | |
|---|---|---|
| *C08J 5/18* | (2006.01) | |
| *C08G 69/40* | (2006.01) | |
| *C08L 77/06* | (2006.01) | |
| *B41J 2/175* | (2006.01) | |
| *G03G 15/08* | (2006.01) | |
| *C09K 3/10* | (2006.01) | |

(56) References Cited

FOREIGN PATENT DOCUMENTS

| | | | | |
|---|---|---|---|---|
| JP | 2008-291243 A | 12/2008 | | |
| JP | 2009-001630 | * 1/2009 | ............. | C08G 81/00 |
| JP | 2009-001630 A | 1/2009 | | |
| JP | 2009-298753 A | 12/2009 | | |
| JP | 2012-214679 A | 11/2012 | | |
| JP | 2013-006963 A | 1/2013 | | |

OTHER PUBLICATIONS

ARES Rehometer, TA Instrument catalog, (online), 2014.*
Heertjes et al: "Polycondensation products of 2,5-furandicarboxylic acid", Delft Progress Report, Series A: Chemistry and Physics, Chemical and Physical Engineering, vol. 1, No. 2, Jan. 1, 1974, pp. 59-63, XP009178421.

* cited by examiner

CHEMICAL SEALING FILM

TECHNICAL FIELD

The present invention relates to a chemical sealing film.

BACKGROUND ART

As materials for related art stretch seal, paraffin resin, vinylidene chloride resin, polyethylene resin, and the like have been used. Paraffin resin has good extensibility and moisture resistance but cracking or fracture may occur due to an organic solvent or the vapor thereof. Vinylidene chloride resin generally has chemical resistance but is soft and films thereof are easily stuck to each other and are easily torn, and therefore, there have been difficulties in use, such that it is difficult to find a take-out slot.

Moreover, the chemical resistance of vinylidene chloride resin to an ether-based solvent and a hydrocarbon-based solvent is low. Furthermore, since chlorine is contained, careful handling of the vinylidene chloride resin is required for incineration. Polyethylene resin has low adhesiveness to various containers, and therefore polyethylene has been limited in use.

Vinylidene chloride has high chemical resistance but low breaking strength. Moreover, vinylidene chloride has low durability to an ether-based solvent and a hydrocarbon-based solvent. Furthermore, since vinylidene chloride contains chlorine, there has been a possibility such that harmful gas is generated when vinylidene chloride is incinerated.

In NPL 1, the chemical resistance of vinylidene chloride has not been clarified.

CITATION LIST

Non Patent Literature

NPL 1 Delft Progress Report, 1974, vol. A1, pp. 59 to 63

SUMMARY OF INVENTION

Thus, the present invention provides a chemical sealing film which has high chemical resistance and high breaking strength and does not contain chlorine.

The invention provides a chemical sealing film containing an organic compound represented by the following general formula (1).

[Chem. 1]

$$\left[ \begin{array}{c} O \\ \| \\ C \end{array} \underset{O}{\bigcirc} \begin{array}{c} O \\ \| \\ C \end{array} - \underset{|}{\overset{H}{N}} - R - \underset{|}{\overset{H}{N}} \right]_n \quad (1)$$

R in general formula (1) is a linear alkylene group having carbon atoms of 5 or more and 10 or less, and n is an integer of 10 or more and 480 or less.

Further features of the present invention will become apparent from the following description of exemplary embodiments with reference to the attached drawings.

DESCRIPTION OF EMBODIMENT

The invention is a chemical sealing film containing an organic compound represented by the following general formula (1).

[Chem. 2]

$$\left[ \begin{array}{c} O \\ \| \\ C \end{array} \underset{O}{\bigcirc} \begin{array}{c} O \\ \| \\ C \end{array} - \underset{|}{\overset{H}{N}} - R - \underset{|}{\overset{H}{N}} \right]_n \quad (1)$$

R in general formula (1) is a linear alkylene group having carbon atoms of 5 or more and 10 or less, and n is an integer of 10 or more and 480 or less.

In particular, the number of carbon atoms of the alkylene group represented by R is suitably 6 or 8.

N represents a polymerization degree. When the polymerization degree is lower than 10, the strength is low, so that the film is easily broken. On the other hand, when the polymerization degree is larger than 480, it is difficult to lengthen the film by hand because the tensile strength is high. The polymerization degree is more suitably 20 or more and 100 or lower.

Since the chemical sealing film according to the invention has excellent extensibility and chemical resistance, the film may seal an opening of a container for food, chemicals, or the like. A stretch film is referred to as a sealing film, a temporary seal material, a wrap film, and the like.

In this embodiment, a single layer film to be used as a stretch seal may be a roll type or a sheet type.

The chemical sealing film according to the invention is polyamide synthesized from furan dicarboxylic acid and various kinds of linear diamines. Therefore, the chemical sealing film according to the invention is excellent in extensibility, chemical resistance, heat resistance, and adhesiveness to a container, and therefore is optimal as a stretch film for a container for chemicals, food, toner, or ink.

More specifically, the chemical sealing film according to the invention can be used for a toner bottle seal or an ink cartridge seal.

The toner bottle seal is a seal for sealing a container storing toner.

The ink cartridge seal is a seal for sealing a tank storing ink, and is applied at an injection port, an ejection port, or the like.

Figure 5:
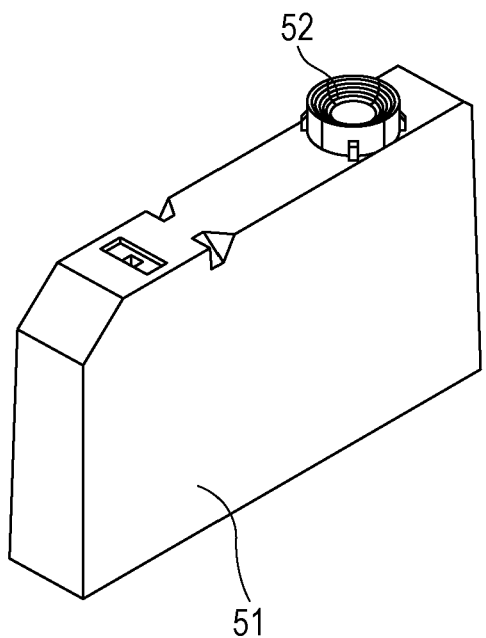
FIG. 5 illustrates an ink cartridge as an example of a liquid storage container having a seal material according to an embodiment of the invention.
Figure 5:
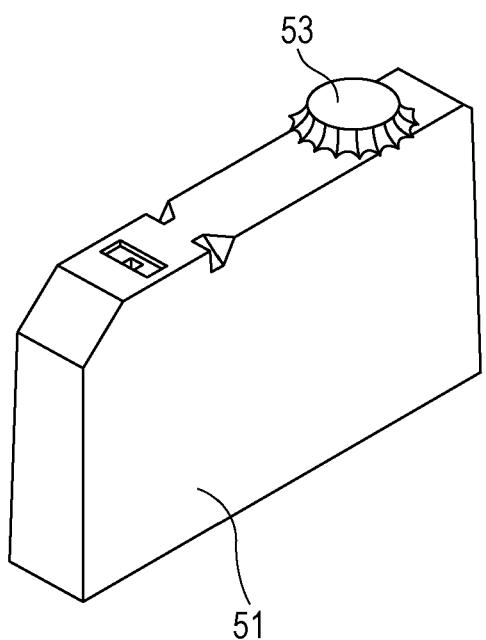

As illustrated in FIG. 5, a seal material according to this embodiment can seal a discharge port of an ink cartridge. In FIG. 5, the reference numerals 51, 52, and 53 denote an ink cartridge, an opening thereof, and the seal material according to this embodiment, respectively.

The film according to the invention has a thickness of suitably 5 μm or more and 1000 μm or less and more suitably 10 μm or more and 100 μm or less.

The polyamide according to this embodiment is a raw material derived from plants for plastic (hereinafter referred to as bioplastic).

Since the bioplastic is manufactured from renewable resources, a reduction in the consumption of fossil resources and a control of an increase in the carbon dioxide concentration in the atmosphere can be achieved.

Since the bioplastic does not chlorine contain, the bioplastic does not emit harmful substances, such as dioxin, even when incinerated in a usual incinerator.

The chemical sealing film according to the invention is a film having high chemical resistance, high breaking strength, and high heat resistance. Furthermore, since chlorine is not contained, the environmental load is suitably small.

Poly(alkylene-2,5-furan dicarboxamide) according to this embodiment can be obtained by polycondensation of 2,5-furan dicarboxylic acid (hereinafter abbreviated as FDCA) or a derivative thereof and linear alkylene diamines, such as 1,4-tetramethylene diamine and 1,6-hexamethylenediamine.

The FDCA is a plant-derived monomer obtained by oxidizing 5-HMF obtained by dehydrating fructose and glucose.

The 5-HMF is obtained by heating and dehydrating fructose and glucose in the presence of an acid catalyst in water or an aprotic bipolarity solvent.

The FDCA is obtained by air-oxidizing the 5-HMF in the presence of a precious metal catalyst, such as platinum, in an aqueous alkaline solution. The FDCA is also obtained by air-oxidizing the 5-HMF in the presence of a complex catalyst, such as cobalt, manganese, and bromine, in an acetic acid solvent under high pressure and high temperature conditions.

Mentioned as a derivative of the FDCA are a FDCA chloride (hereinafter abbreviated as FDCC), FDCA dimethylester, FDCA diethylester, and the like.

Mentioned as a polymerization method for obtaining the poly(alkylene-2,5-furan dicarboxamide) according to this embodiment are usually known methods, such as interfacial polymerization, solution polymerization, and mass polymerization, and the method is selected as appropriate depending on the types of molded articles. A polymerization temperature, a polymerization catalyst, a medium, such as a solvent, and the like can be selected in accordance with each of the polymerization methods.

[Chem. 3]

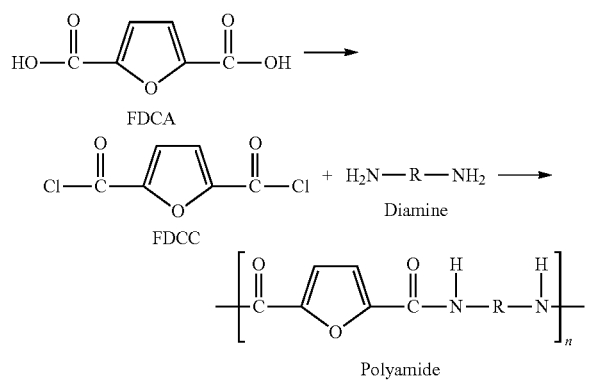

FDCA

FDCC

Polyamide

R represents $(CH_2)m$, where m is an integer of 4 or more and 10 or less. The terminal of the polymer is a hydroxyl group or hydrogen.

A method for manufacturing the poly(alkylene-2,5-furan dicarboxamide) according to this embodiment includes two processes. A first process includes synthesis of the FDCC and a second process includes polycondensation by interfacial polymerization of the FDCC and diamine.

First, the chlorination of carboxylic acid of FDCA which is the first process is described. In the manufacturing method according to this embodiment, the FDCA is chlorinated with a chlorinating agent. As a chlorinating agent to be used, usually known chlorinating agents are used. As a specific example, thionyl chloride, sulfuryl chloride, phosphoryl chloride, phosphorous pentachloride, and the like can be mentioned. Among the specific example, thionyl chloride is suitably used because thionyl chloride can be easily removed after a reaction.

These chlorinating agents are used in a proportion of 2 chemical equivalent (Eq.) or more based on the FDCA. When the amount is smaller than 2 Eq, carboxylic acid remains even after the chlorination reaction, which becomes a cause of the fact that the molecular weight does not increase in the polycondensation process.

The chlorination reaction is suitably performed at a temperature equal to or lower than the boiling point of the chlorinating agent. For example, when thionyl chloride is used as the chlorinating agent, the chlorination reaction is suitably performed at a temperature of 50° C. to 85° C. The reaction time is usually from about 30 minutes to about 5 hours. When the reaction time is shorter than 30 minutes, the chlorination reaction does not sufficiently proceed.

In the manufacturing method according to this embodiment, the chlorination reaction is usually performed in the absence of a solvent but the reaction can also be performed in a solvent which is inactive to the reaction and has a boiling point higher than the reaction temperature.

The chlorination reaction is suitably performed in an atmosphere of inactive gas under normal pressure and can also be performed in an atmosphere of air under reduced pressure or increased pressure.

The chlorination reaction usually proceeds in an absence of a catalyst but known catalysts may be added as required. For example, when thionyl chloride is used as the chlorinating agent, it is suitable to add dimethylformamide in a proportion of 0.001 Eq to 0.5 Eq based on the FDCA.

The FDCC synthesized by the chlorination reaction is usually refined by known methods, and thereafter is used for a polycondensation reaction.

Next, the polycondensation by interfacial polymerization of the FDCC and diamine, which is the second process, is described.

Diamine is used in a proportion of 1 Eq or more based on the FDCA and particularly suitably 1.1 Eq to 1.7 Eq. When diamine is sufficiently present, the reaction is not affected. However, when diamine is present in a proportion of lower than 1 Eq, the FDCC remains even after the polycondensation reaction, which causes reduction in physical properties of products.

As a solvent of an organic layer which dissolves the FDCC, chloroform is suitable.

The polycondensation reaction is suitably carried out by placing a water layer in a vessel at normal temperature, and then pouring an organic layer therein for reaction.

The reaction is suitably performed by a still-standing method or a stirring method. According to the still-standing method, a polymer generated at the interface is drawn, so that a new polymer is generated at the interface, whereby a fibrous (string-shaped) product is generated.

As the vessel to be used in the case of the still-standing method, a vessel having a reaction area such that a film of the polymer generated at the interface is not broken due to the weight of itself is suitable. The polymer is drawn by a metal rod having a diameter of 8 mm at a rotation rate of 60 rpm until the polymer at the interface disappears. The reaction time is from about 1 hour to about 6 hours.

According to the stirring method, the interface becomes large, so that the reaction can be made to rapidly proceed. The reaction can be carried out in a reaction time of about 30 minutes to about 2 hours. When the reaction time is shorter than 30 minutes, the polycondensation reaction does not sufficiently proceed. A vessel to be used in the stirring method is suitably selected in accordance with the amount of the contents.

A measuring method for measuring the polyamide according to this embodiment is described below.

[GPC Analysis]
Sample concentration: 0.2%
Analytical instrument: Alliance 2695 manufactured by Waters Co., Ltd.
Detector: Differential refraction detector manufactured by wyatt Co., Ltd.
Eluate: 5 mM Sodium Trifluoroacetate in HFIP
Flow rate: 1.0 ml/min
Column: shodex GPC HFIP-806M×2+HFIP-803×1
Column temperature: 25° C.
Calibration curve: PMMA conversion

[Glass Transition Temperature (Tg) Measurement]
Device name: Differential scanning calorimetric analyzer (DSC) manufactured by TA Instruments Inc.
Pan: Aluminum pan
Sample weight: 2 mg to 3 mg
Temperature elevation starting temperature: 30° C.
Temperature elevation rate: 1st: 10° C./min, 2nd: 5° C./min
Atmosphere: nitrogen

[Thermal Cracking Temperature (Td) Measurement*[1]]
Device name: Thermogravimeter (TGA) manufactured by TA Instruments Inc.
Pan: Platinum pan
Sample weight: 3 mg
Temperature elevation starting temperature: 30° C.
Measurement mode: Dynamic rate method*[2]
Atmosphere: nitrogen

*1 The temperature at which 10% weight reduction was observed was defined as Td.
*2 Measurement mode in which the heating rate is controlled in accordance with the degree of weight changes, and the resolution ability improves.

[$^1$H-NMR Measurement]
Device: Nuclear magnetic resonance device manufactured by JEOL Co., Ltd.
Solvent: CF3COOD

[FT-IR]
Device name: Fourier transform infrared spectrophotometer manufactured by Perkin Elmer Co., Ltd.
Measurement resolution: 4 cm$^{-1}$
Number of times of scanning: 20
Measurement range: 4000 cm$^{-1}$ to 400 cm$^{-1}$

[Tensile Test]
Device name: Autograph AG-IS 20kNT manufactured by Shimadzu Corporation
Load cell: 20 kN or 50 N
Sample piece: 24 mm in width, 150 mm in length, 100 mm in distance between chucks
Tensile speed: 50 mm/minute

REACTION EXAMPLE 1

Synthesis of FDCC

A 50 mL three-necked flask having a nitrogen inlet tube, a condenser tube, a thermometer, and a stirring blade was prepared. Into the three-necked flask, FDCA (15.7 g; 100 mmol), thionyl chloride (30.6 ml; 400 mmol), and dimethylformamide (0.741 ml; 9.57 mmol) were introduced.

Stirring was started while introducing nitrogen into the three-necked flask and simultaneously the three-necked flask was immersed in an oil bath set to 85° C., and then held for about 2 hours.

The temperature of the oil bath was set to 40° C., and the pressure was reduced to 20 kPa or lower. The pressure was continuously reduced until the distillate disappeared. Thereafter, the pressure was returned to normal pressure, and then the flask was cooled to room temperature. Then, hexane (1 L) was put in the three-necked flask to dissolve the reactant.

The solution was cooled to −20° C., and then the precipitated needle crystal was filtered. The obtained FDCC was 8.03 g and the yield was 41.5 mol %.

REACTION EXAMPLE 2

Synthesis of PA4F (poly(butylene-2,5-furan dicarboxamide))

A 1000 ml beaker for a water layer, a 500 ml conical beaker for an organic layer, and an automatic rotation bar for drawing a polymer having a diameter of 8 mm were prepared.

First, FDCC (5.0 g; 26 mmol) was introduced in the 500 ml conical beaker, 250 ml of chloroform dehydrated by magnesium sulfate was placed therein, and then the mixture was stirred with a magnetic stirrer until the solid disappeared.

In the 1000 ml beaker, an aqueous sodium hydroxide solution in which sodium hydroxide (2.5 g, 63 mmol) was dissolved with 250 ml of purified water was prepared, 1,4-butylene diamine (3.12 ml; 31.2 mmol) was introduced, and then the mixture was stirred with a glass bar until the mixture became uniform.

An organic layer was quickly poured into the beaker in such a manner that bubbles were not formed in the beaker of the water layer, a polymer generated at the interface was pulled up with tweezers, and then the polymer was wound around the automatic rotation bar to be rotate at a speed of 60 rpm. The reaction was carried out for about 1 hour while maintaining the speed until the reaction at the interface was completed to thereby obtain the polymer.

After the reaction according to the still-standing method was completed, a magnetic stirrer was put into the remaining reaction liquid, and then stirred at a rotation speed of 1000 rpm to thereby obtain the polymer.

The obtained polymer was sufficiently washed with acetone, and then dried for 1 day under conditions of drying under reduced pressure at 130° C. The polymer obtained after drying was 4.5 g, and the yield was 82 mol %.

The weight average molecular weight of poly(butylene-2, 5-furan dicarboxamide) was 54000 and the Tg thereof was 153° C.

Figure 1:
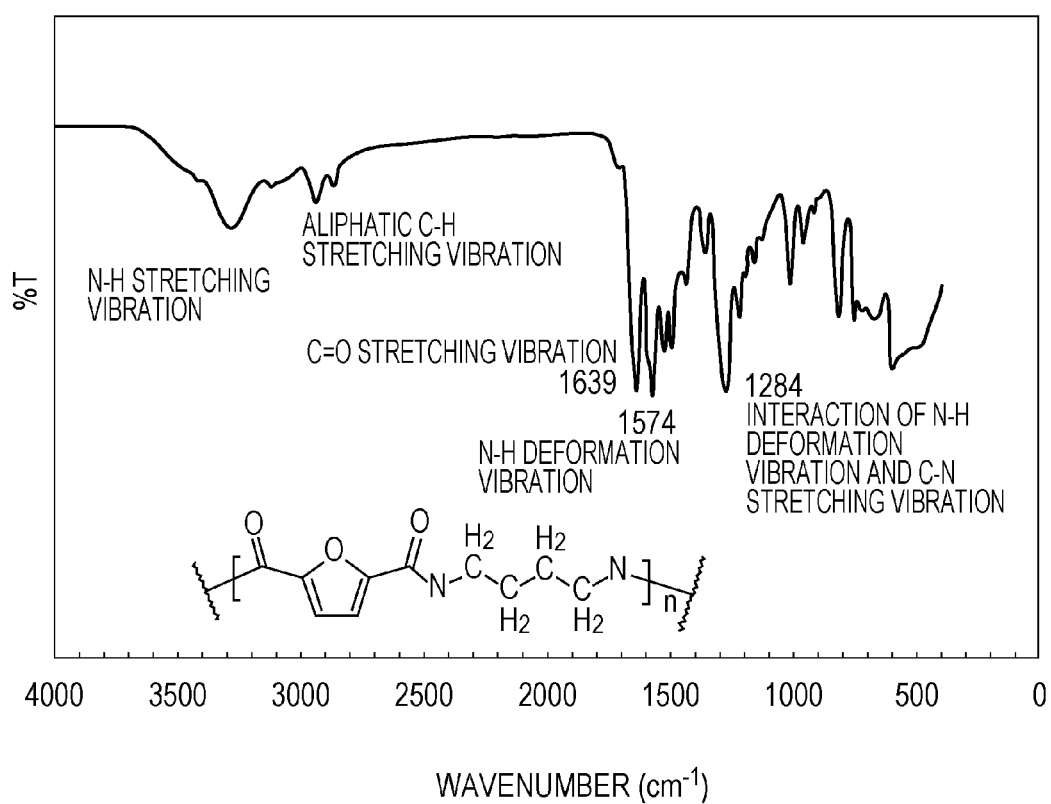
FIG. 1 illustrates an FT-IR spectrum of PA4F.

The FT-IR spectrum (FIG. 1) of this polymer showed N—H stretching vibration around 3300 cm$^{-1}$, aliphatic C—H stretching vibration around 2900 cm$^{-1}$, C═O stretching vibration around 1639 cm$^{-1}$, N—H deformation vibration around 1574 cm$^{-1}$, and the interaction of N—H deformation vibration and C—N stretching vibration around 1284 cm$^{-1}$. Therefore, it was confirmed that the polymer was polyamide.

Figure 2:
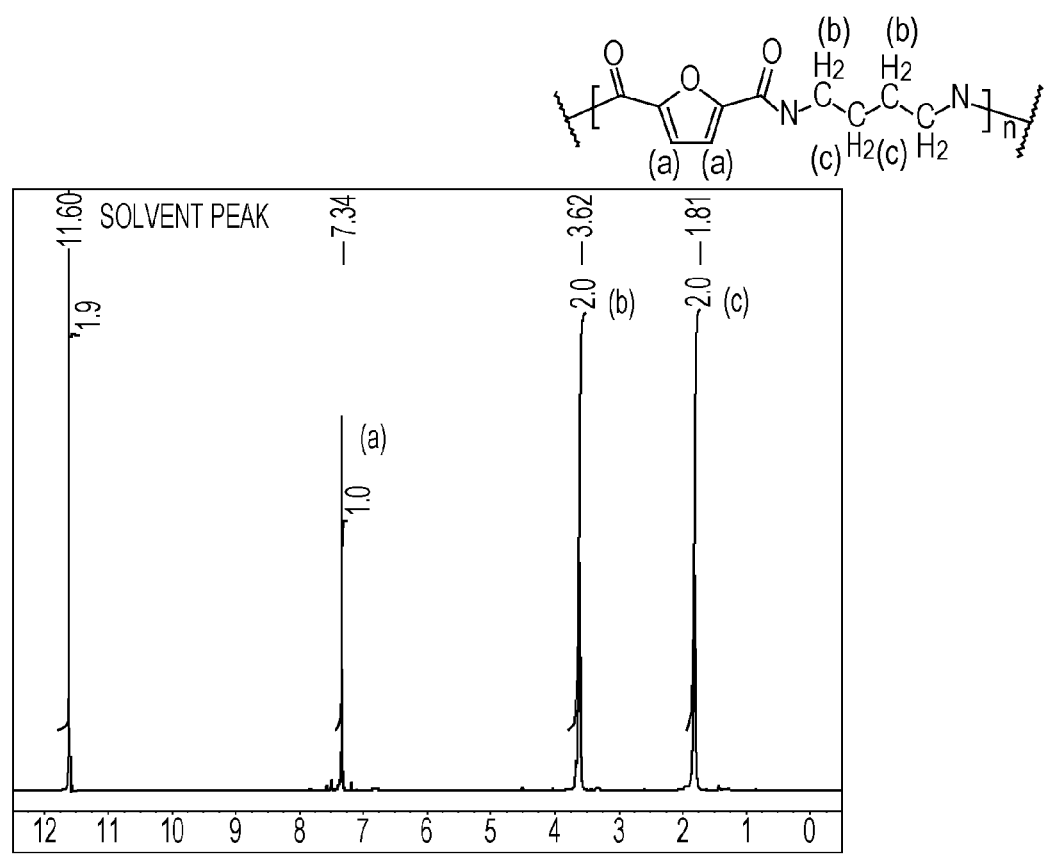
FIG. 2 illustrates an NMR spectrum of PA4F.

On the other hand, the $^1$H-NMR spectrum (FIG. 2) showed δ=1.81 ppm (c), δ=3.62 ppm (b), and δ=7.34 ppm (a). The peak of N—H proton was overlapped with the solvent peak (δ=11.60 ppm), and the δ of N—H proton was indistinguishable. Considering the FT-IR results and the integration ratio (a):(b):(c)=1:2:2, it is confirmed that this product is poly(butylene-2,5-furan dicarboxamide).

REACTION EXAMPLE 3

Synthesis of PA6F (poly(hexylene-2,5-furan dicarboxamide))

A polymer was obtained in the same manner as in Reaction Example 2, except changing 1,4-butylene diamine in Reaction Example 1 to 1,6-hexamethylene diamine.

The obtained polymer was sufficiently washed with acetone, and then dried for 1 day under reduced pressure at 130° C. The polymer obtained after drying was 3.9 g, and the yield was 63 mol %.

The weight average molecular weight of poly(butylene-2,5-furan dicarboxamide) was 65000 and the Tg thereof was 150° C.

Figure 3:
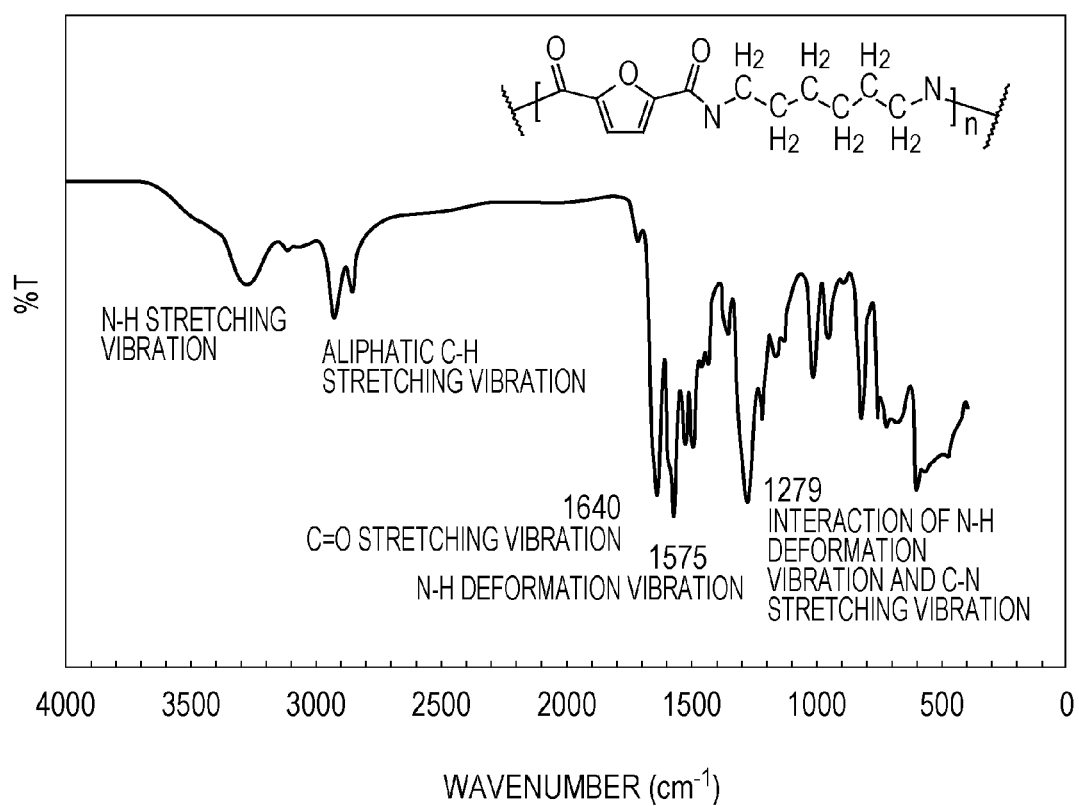
FIG. 3 illustrates an FT-IR spectrum of PA6F.

The FT-IR spectrum (FIG. 3) of this polymer showed N—H stretching vibration around 3300 cm$^{-1}$, aliphatic C—H stretching vibration around 2900 cm$^{-1}$, C=O stretching vibration around 1640 cm$^{-1}$, N—H deformation vibration around 1575 cm$^{-1}$, and the interaction of N—H deformation vibration and C—N stretching vibration around 1279 cm$^{-1}$. Therefore, it was confirmed that the polymer was polyamide.

Figure 4:
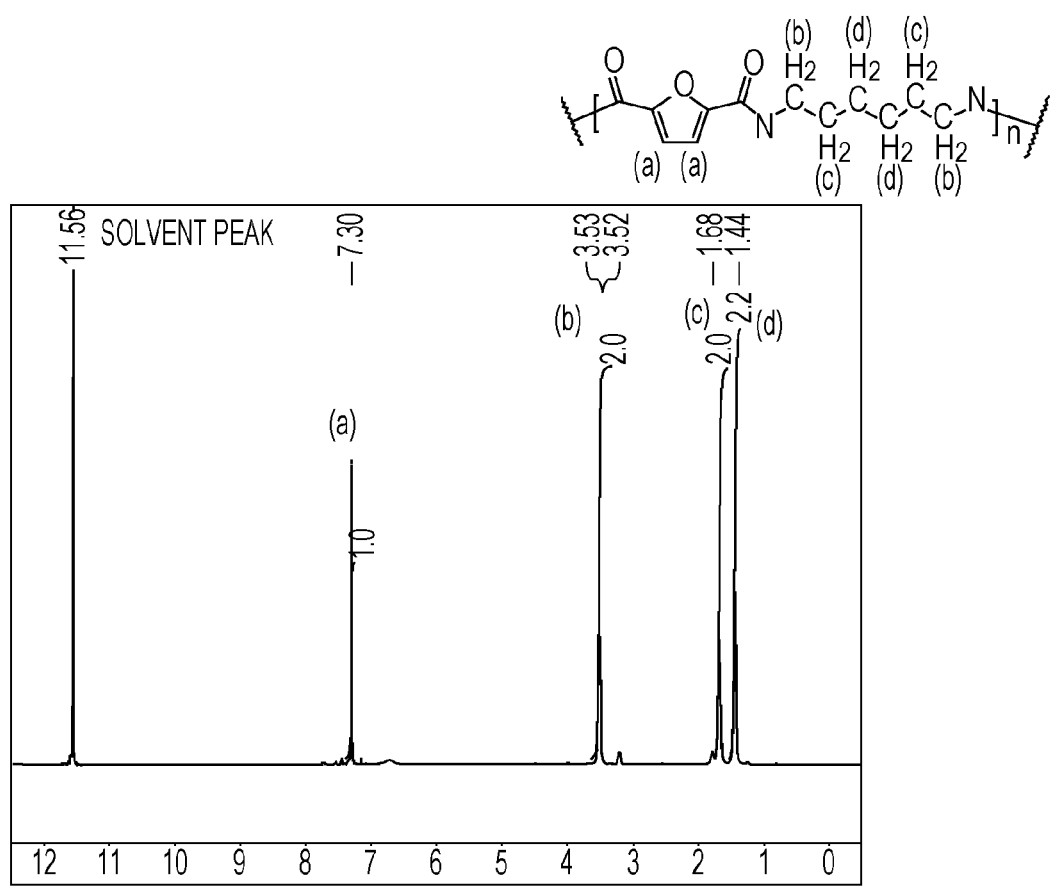
FIG. 4 illustrates an NMR spectrum of PA6F.

On the other hand, the $^1$H-NMR spectrum (FIG. 4) showed δ=1.44 ppm (d), δ=1.68 ppm (c), δ=3.53 ppm (b), and δ=7.30 ppm (a). The N—H proton was overlapped with the solvent peak (δ=11.56 ppm), and was indistinguishable. Considering the FT-IR results and the integration ratio (a):(b):(c):(d)=1:2:2:2, it was clarified that this product is poly(hexylene-2,5-furan dicarboxamide).

REACTION EXAMPLE 4

Synthesis of PA5F (poly(pentylene-2,5-furan dicarboxamide))

Polymerization was performed in the same manner as in Reaction Example 2, except using 1,5-diaminopentane (3.90 ml; 31.2 mmol) in place of the 1,4-butylene diamine in Reaction Example 2. A polymer obtained after drying was 2.0 g, and the yield was 18 mol %.

The weight average molecular weight of poly(pentylene-2,5-furan dicarboxamide) was 33000 and the Tg thereof was 142° C.

The FT-IR spectrum of this polymer showed N—H stretching vibration around 3300 cm$^{-1}$, aliphatic C—H stretching vibration around 2900 cm$^{-1}$, C=O stretching vibration around 1640 cm$^{-1}$, N—H deformation vibration around 1575 cm$^{-1}$, and the interaction of N—H deformation vibration and C—N stretching vibration around 1279 cm$^{-1}$. Therefore, it was confirmed that the polymer was polyamide.

On the other hand, the $^1$H-NMR spectrum (not illustrated) showed δ=1.55 ppm (d), δ=1.81 ppm (c), δ=3.61 ppm (b), and δ=7.38 ppm (a).

The N—H proton was overlapped with the solvent peak (δ=11.56 ppm), and was indistinguishable.

Considering the FT-IR results and the integration ratio (a):(b):(c):(d)=1:2:2:1, it was clarified that this product is poly(pentylene-2,5-furan dicarboxamide).

REACTION EXAMPLE 5

Synthesis of PA7F (poly(heptylene-2,5-furan dicarboxamide))

Polymerization was performed in the same manner as in Reaction Example 2, except using 1,7-diaminopentane (4.15 g; 31.2 mmol) in place of the 1,4-butylene diamine in Reaction Example 2. A polymer obtained after drying was 3.7 g, and the yield was 42 mol %.

The weight average molecular weight of poly(heptylene-2,5-furan dicarboxamide) was 30000 and the Tg thereof was 131° C.

The FT-IR spectrum of this polymer showed N—H stretching vibration around 3300 cm$^{-1}$, aliphatic C—H stretching vibration around 2900 cm$^{-1}$, C=O stretching vibration around 1640 cm$^{-1}$, N—H deformation vibration around 1575 cm$^{-1}$, and the interaction of N—H deformation vibration and C-N stretching vibration around 1279 cm$^{-1}$. Therefore, it was confirmed that the polymer was polyamide.

On the other hand, the $^1$H-NMR spectrum (not illustrated) showed δ=1.43 ppm (d+e), δ=1.70 ppm (c), δ=3.54 ppm (b), and δ=7.33 ppm (a). The N—H proton was overlapped with the solvent peak (δ=11.56 ppm), and was indistinguishable.

Considering the FT-IR results and the integration ratio (a):(b):(c):(d+e)=1:2:2:3, it was clarified that this product is poly(heptylene-2,5-furan dicarboxamide).

REACTION EXAMPLE 6

Synthesis of PA8F (poly(octylene-2,5-furan dicarboxamide))

Polymerization was performed in the same manner as in Reaction Example 2, except using 1,8-diaminooctane (4.74 g; 31.2 mmol) in place of the 1,4-butylene diamine in Reaction Example 2. A polymer obtained after drying was 4.5 g, and the yield was 52 mol %.

The weight average molecular weight of poly(octylene-2,5-furan dicarboxamide) was 47000 and the Tg thereof was 131° C.

The FT-IR spectrum of this polymer showed N—H stretching vibration around 3300 cm$^{-1}$, aliphatic C—H stretching vibration around 2900 cm$^{-1}$, C=O stretching vibration around 1640 cm$^{-1}$, N—H deformation vibration around 1575 cm$^{-1}$, and the interaction of N—H deformation vibration and C—N stretching vibration around 1279 cm$^{-1}$. Therefore, it was confirmed that the polymer was polyamide.

On the other hand, the $^1$H-NMR spectrum (not illustrated) showed δ=1.40 ppm (d+e), δ=1.70 ppm (c), δ=3.54 ppm (b), and δ=7.34 ppm (a). The N—H proton was overlapped with the solvent peak (δ=11.56 ppm), and was indistinguishable.

Considering the FT-IR results and the integration ratio (a):(b):(c):(d+e)=1:2:2:4, it was clarified that this product is poly(octylene-2,5-furan dicarboxamide).

REACTION EXAMPLE 7

Synthesis of PA9F (poly(nonylene-2,5-furan dicarboxamide))

Polymerization was performed in the same manner as in Reaction Example 2, except using 1,9-diaminononane (5.09 g; 31.2 mmol) in place of the 1,4-butylene diamine in Reaction Example 2. A polymer obtained after drying was 2.1 g, and the yield was 16 mol %.

The weight average molecular weight of poly(nonylene-2,5-furan dicarboxamide) was 28000 and the Tg thereof was 88° C.

The FT-IR spectrum of this polymer showed N—H stretching vibration around 3300 cm$^{-1}$, aliphatic C—H stretching vibration around 2900 cm$^{-1}$, C=O stretching vibration around 1640 cm$^{-1}$, N—H deformation vibration around 1575 cm$^{-1}$, and the interaction of N—H deformation vibration and C—N stretching vibration around 1279 cm$^{-1}$. Therefore, it was confirmed that the polymer was polyamide.

On the other hand, the $^1$H-NMR spectrum (not illustrated) showed δ=1.87 ppm (d+e+f), δ=1.88 ppm (c), δ=3.53 ppm (b), and δ=7.32 ppm (a). The N—H proton was overlapped with the solvent peak (δ=11.56 ppm), and was indistinguishable. Considering the FT-IR results and the integration ratio (a):(b):(c):(d+e+f)=1:2:2:5, it was clarified that this product is poly(nonylene-2,5-furan dicarboxamide).

REACTION EXAMPLE 8

Synthesis of PA10F (poly(decylene-2,5-furan dicarboxamide))

Into a 100 ml four necked flask, FDCC (5.0 g; 26 mmol) was introduced, 1,10-diaminodecane (5.66 g; 31.2 mmol) was introduced thereinto, and then the mixture was stirred for 5 hours while increasing the temperature from 60° C. to 200° C., thereby obtaining a polymer.

The polymer obtained after drying was 2.1 g, and the yield was 16 mol %.

The weight average molecular weight of poly(decylene-2,5-furan dicarboxamide) was 10000 and the Tg thereof was 105° C.

The FT-IR spectrum of this polymer showed N—H stretching vibration around 3300 cm$^{-1}$, aliphatic C—H stretching vibration around 2900 cm$^{-1}$, C=O stretching vibration around 1640 cm$^{-1}$, N—H deformation vibration around 1575 cm$^{-1}$, and the interaction of N—H deformation vibration and C—N stretching vibration around 1279 cm$^{-1}$. Therefore, it was confirmed that the polymer was polyamide.

On the other hand, the $^1$H-NMR spectrum (not illustrated) showed δ=1.32 ppm (d+e+f), δ=1.65 ppm (c), δ=3.52 ppm (b), and δ=7.37 ppm (a). The N—H proton was overlapped with the solvent peak (δ=11.56 ppm), and was indistinguishable.

Considering the FT-IR results and the integration ratio (a):(b):(c):(d+e+f)=1:2:2:6, it was clarified that this product is poly(decylene-2,5-furan dicarboxamide).

EXAMPLES

Example 1 to 6

Manufacturing and Tensile Test of Film

The PA6F obtained by the interfacial polymerization method was dissolved in HFIP with a concentration of 5 wt %, and then 0.2 wt % of diphenyl ether was added as a volatilization rate regulator. Using this solution, casting was carried out several times by a standard method.

After drying, a film was separated. The film thickness was about 50 μm. This film was cut into a rectangular shape with a width of 24 mm and a length of about 150 mm. The maximum tensile stress and the breaking elongation of the obtained film were measured.

Similarly, the PA5F, PA7F, PA8F, PA9F, and PA10F synthesized by a melt polymerization method were formed into films, and then formed into a rectangular shape. The PA4F was not able to be formed into a film because cracking occurred in drying after casting. The thickness of the films was as follows: PA5F (10 μm), PA7F (13 μm), PA8F (15 μm), PA9F (16 μm), and PA10F (15 μm). The presence of halogen was also described.

Similarly as above, a vinylidene chloride wrap (Material: polyvinylidene chloride resin, a fatty acid derivative (softening agent), a stabilizer (epoxidized vegetable oil), Thickness: 20 μm), a paraffin-based seal material (Material: paraffin, Thickness: 125 μm), and a polyethylene wrap (Material: polyethylene, Thickness: 10 μm) were similarly measured. The results are shown in Table 1.

TABLE 1

|  |  | Maximum tensile stress | Break Elongation | Content of halogen |
|---|---|---|---|---|
| Example 1 | PA6F film | 10 | 180 | Not containing |
| Example 2 | PA5F film | 55 | 190 | Not containing |
| Example 3 | PA7F film | 35 | 3 | Not containing |
| Example 4 | PA8F film | 34 | 22 | Not containing |
| Example 5 | PA9F film | 9 | 190 | Not containing |
| Example 6 | PA10F film | 5 | 75 | Not containing |
| Comparative Example 1 | Paraffin wrap material | 1 | 320 | Not containing |
| Comparative Example 2 | Vinylidene chloride wrap material | 18 | 17 | Containing |
| Comparative Example 3 | Polyethylene wrap material | 2 | 142 | Not containing |
| *Reference value | Nylon 6 film | 75 | 7200 | Not containing |

|  |  | Number average molecular weight | Weight average molecular weight | Polymerization degree | Tg |
|---|---|---|---|---|---|
| Example 1 | PA6F film | 5000 | 65000 | 21 | 153 |
| Example 2 | PA5F film | 220000 | 33000 | 98 | 141.8 |
| Example 3 | PA7F film | 14000 | 30000 | 56 | 131.2 |
| Example 4 | PA8F film | 16000 | 47000 | 62 | 130.6 |
| Example 5 | PA9F film | 12000 | 28000 | 44 | 67.7 |
| Example 6 | PA10F film | 4000 | 10000 | 15 | 104.7 |
| Comparative Example 1 | Paraffin wrap material |  |  |  |  |
| Comparative Example 2 | Vinylidene chloride wrap material |  |  |  |  |
| Comparative Example 3 | Polyethylene wrap material |  |  |  |  |
| Reference Value | PA4F film | 12000 | 53000 | 58 | 153 |
| *Reference value | Nylon 6 film | 75 | 7200 |  |  |
|  |  | (MPa) | (%) |  |  |

*Based on the explanation of materials of Wellco Holdings Co., Ltd. Test method: ASDM D-638.

The PA5F, PA6F, PA8F, and PA9F are all easily stretched by hand as films of 10 to 50 μm, have high extensibility, and are suitable as a stretch seal material.

It was found that Nylon 6 has high breaking elongation but has high tensile strength, and therefore Nylon 6 is difficult to extend by hands and lacks suitability as a stretch seal material.

Adhesion Properties and Chemical Resistance

In order to confirm the effects of a seal, 5 ml of various kinds of test liquids were poured in a glass test tube having a diameter of 10 mm and a length of 90 mm, and a stretch seal material was stuck to an opening portion of the test tube while extending the same for sealing.

The sealed portion of the container was perpendicularly turned downward for 10 seconds at room temperature, and 10 minutes later, the sealed portion was perpendicularly turned upward. Then, changes of the film were observed. The results were shown in Table 2. As chemicals, a 28% ammonia water (manufactured by Kishida Chemical Co., Ltd., Special grade), n-hexane (manufactured by Kishida Chemical Co., Ltd., Special grade), ethyl acetate (manufactured by Kishida Chemical Co., Ltd., Special grade), and diethylether (manufactured by Kishida Chemical Co., Ltd., Special grade) were used.

TABLE 2

|  | Seal materials/ chemicals | Extensibility | Adhesiveness | Chemical resistance |  |  |  |
|---|---|---|---|---|---|---|---|
|  |  |  |  | Liquid ammonia | n-hexane | Ethyl acetate | Diethyl ether |
| Example 1 | PA6F film | ○ | ○ | ○ No influence | ○ No influence | ○ No influence | ○ No influence |
| Example 2 | PA5F film | ○ | ○ | X Softened | ○ No influence | ○ No influence | ○ No influence |
| Example 3 | PA7F film |  | ○ | ○ No influence | ○ No influence | ○ No influence | ○ No influence |
| Example 4 | PA8F film | ○ | ○ | ○ No influence | ○ No influence | ○ No influence | ○ No influence |
| Example 5 | PA9F film | ○ | ○ | ○ No influence | ○ No influence | X Softened | X Softened |
| Example 6 | PA10F film | ○ | ○ | X Softened | ○ No influence | X Softened | X Softened |
| Comparative Example 4 | Paraffin wrap material | ○ | ○ | ○ No influence | X Dissolution | ○ No influence | X Cracking |
| Comparative Example 5 | Vinylidene chloride wrap material | X | ○ | ○ No influence | ○ No influence | Δ Swollen | ○ No influence |
| Comparative Example 6 | Polyethylene wrap material | ○ | Δ | ○ No influence | X Cracking | Δ Swollen | ○ No influence |
| *Reference value | Nylon 6 film | X |  |  |  |  |  |

In Table 2, ○ means "Good", Δ means "Inferior to ○", and X means "Bad performance".

The test results showed that the PA5F, PA6F, PA8F, PA9F, PA10F, the paraffine wrap material, and the polyethylene wrap material had good extensibility. The PA7F and the vinylidene chloride wrap material were poor in extensibility. In terms of the adhesion properties to openings of a glass bottle or a plastic bottle, the PA5F, PA6F, PA7F, PA8F, PA9F, PA10F, the paraffine wrap material, and the vinylidene chloride wrap material were good and the polyethylene wrap material was poor.

The test results showed that the PA6F film is a useful sealing film to liquid ammonia, n-hexane, ethyl acetate, and diethylether. In addition, the film is resistant to dilute sulfuric acid, dilute nitric acid, caustic soda, and the like and can be applied to various kinds of chemicals. Furthermore, since the film has stretchability, the film is suitable as a sealing material.

On the other hand, the paraffin-based wrap material is weak to n-hexane and diethylether. The vinylidene chloride-based wrap material is not generally affected by various kinds of chemicals but absorbs ethyl acetate to be swollen.

It was found that the polyethylene-based wrap material suffers from cracking due to n-hexane and absorbs ethyl acetate to be swollen.

The film containing polyamide according to the invention can be used as a stretch seal material for food and various kinds of chemicals. As the applicable range thereof, the film can seal a wide range of substances as compared with former stretch seal materials.

Advantageous Effects of Invention

The invention can provide a chemical sealing film which has high chemical resistance and high breaking strength and which does not contain chlorine.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-011299, filed Jan. 23, 2012 and No. 2012-268546, filed Dec. 7, 2012, which are hereby incorporated by reference herein in their entirety.

The invention claimed is:

1. A chemical sealing film containing an organic compound represented by the following general formula (1),

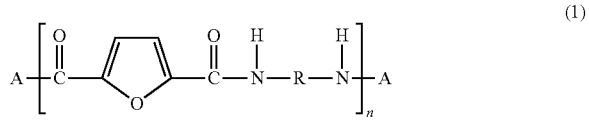

wherein, in the general formula (1), R is a linear alkylene group having carbon atoms of 5 or more and 10 or less, n is an integer of 10 or more and 480 or less, and A is a hydroxyl group or a hydrogen atom; and
a thickness of the chemical sealing film is 10 μm or more and 100 μm or less.

2. A stretch seal material, comprising the chemical sealing film according to claim 1.

3. A toner bottle seal material, comprising the chemical sealing film according to claim 1.

4. An ink cartridge seal material, comprising the chemical sealing film according to claim 1.

5. The chemical sealing film according to claim 1, wherein said n is an integer of 56 or more and 480 or less.

6. The chemical sealing film according to claim 1, wherein said n is an integer of 56 or more and 98 or less.

* * * * *